No. 764,430. Patented July 5, 1904.

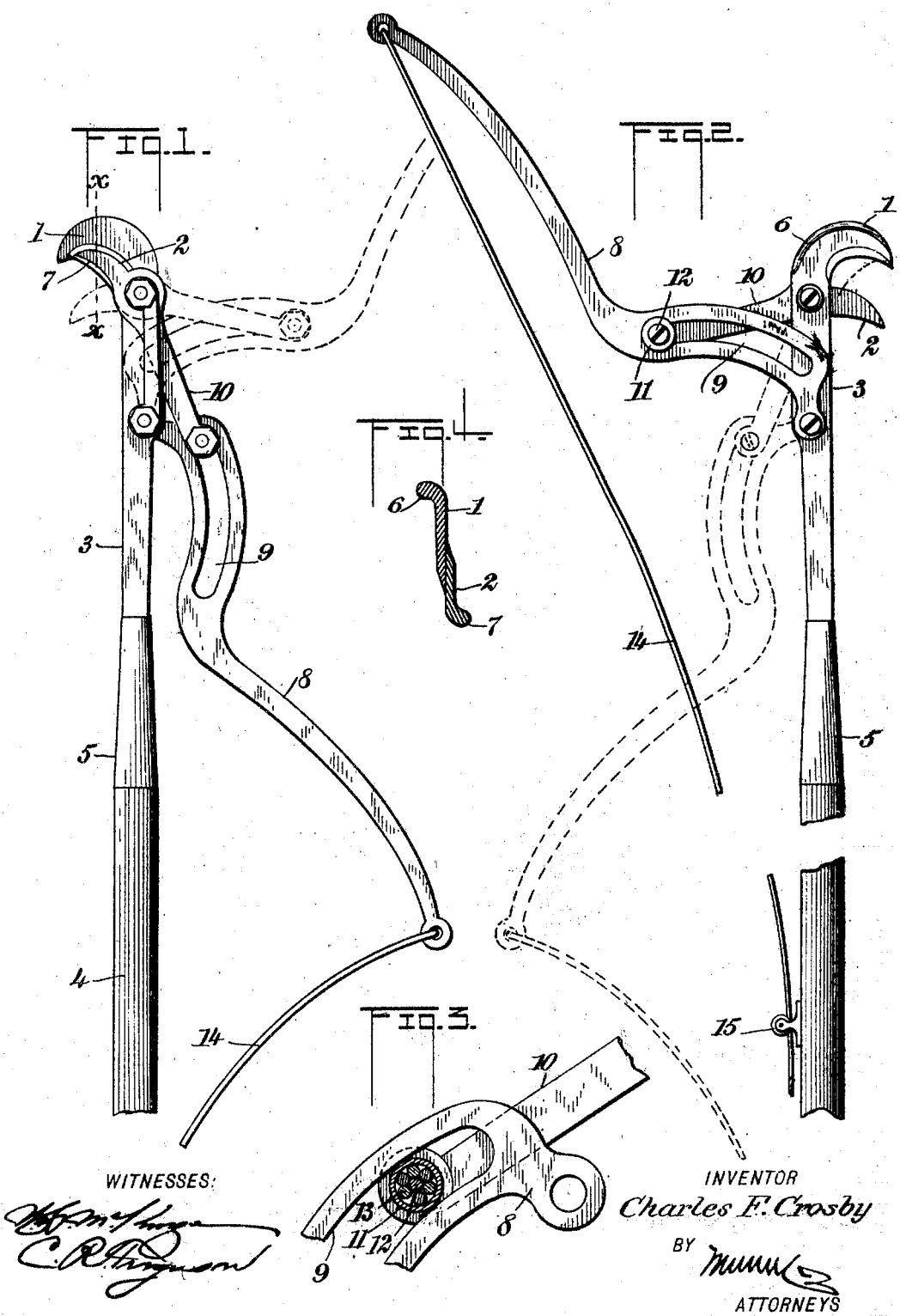

UNITED STATES PATENT OFFICE.

CHARLES FRANCIS CROSBY, OF BURLINGTON, VERMONT.

PRUNING-SHEARS.

SPECIFICATION forming part of Letters Patent No. 764,430, dated July 5, 1904.

Application filed November 17, 1903. Serial No. 181,499. (No model.)

*To all whom it may concern:*

Be it known that I, CHARLES FRANCIS CROSBY, a citizen of the United States, and a resident of Burlington, in the county of Chittenden and State of Vermont, have invented new and Improved Pruning-Shears, of which the following is a full, clear, and exact description.

This invention relates to improvements in pruning-shears, the object being to provide pruning-shears of simple, light, yet strong construction, having no parts liable to get out of order, and so arranged that there will be very little friction of the movable parts and with which a clean cross-cut may be made without drawing action, which would have a tendency to break the bark.

I will describe pruning-shears embodying my invention and then point out the novel features in the appended claims.

Reference is to be had to the accompanying drawings, forming a part of this specification, in which similar characters of reference indicate corresponding parts in all the figures.

Figure 1 is a side view of pruning-shears embodying my invention, showing the cutting-blades in closed position; Fig. 2 is a similar view, but showing the blades open; Fig. 3 is a fragmentary detail showing the cam mechanism employed, and Fig. 4 is a section on the line *x x* of Fig. 1.

Referring to the drawings, 1 designates the hook-shaped cutting-blade, and 2 the movable curved blade, pivotally connected to the shank portion 3 of the blade 1. This shank portion 3 is connected to a handle 4 of suitable length by means, as here shown, of a ferrule 5.

Extended along the outer side and near the back edge of the blade 1 is a rib 6, and a similar rib 7 extends along the back edge of the blade 2. These ribs serve to strengthen the blades and to prevent any spring yielding movement thereof.

Mounted to swing on the shank 3 is a lever 8, having a curved or cam slot 9, receiving a wrist-pin attached to the shank 10 of the movable blade. To reduce the friction to a minimum, this wrist-pin consists of a sleeve 11, surrounding a pin 12, attached to the shank 10, and between the sleeve and pin are rollers 13. From the outer end of the lever 8 a spring-steel rod or wire 14 extends downward through a guide, consisting, as here shown, of a roller 15, attached to the handle 4. The lower end of the rod 14 will be provided with a suitable handpiece.

In operation it is obvious that by drawing downward on the rod 14 the blade 2 will be moved in cutting direction, and the hook shape of the blade 1 will prevent any sliding movement of the blades on the limb, and thus a clean cross-cut will be made. After the cutting and by a slight upward movement of the rod 14 the resiliency thereof will cause the lever 8 to be moved upward, opening the blades, as indicated in Fig. 2.

In pruning-shears embodying my invention a great leverage is provided, so that a comparatively thick branch or limb may be cut with very little manual exertion.

Having thus described my invention, I claim as new and desire to secure by Letters Patent—

1. Pruning-shears, comprising a handle provided with a guide, a hook-shaped blade at one end of the handle, a second blade pivoted to the shank of the first-named blade and provided with a pin at the end of its shank, a curved lever pivoted to the shank of the hook-shaped blade and having a curved or cam slot receiving the pin of the pivoted blade, and a spring rod or wire secured to the outer end of the lever and extending down through the guide of the handle.

2. Pruning-shears, comprising a handle, a hook-shaped blade at one end of the handle, a second blade pivoted to the shank of the hook-shaped blade, a wrist-pin on the shank of the second blade and consisting of a pin, a sleeve on the pin and rollers between the pin and sleeve, a curved lever pivoted to the shank of the hook-shaped blade and provided with a curved slot receiving said wrist-pin, and a rod or wire secured to the outer end of the lever and extending down within reach of the operator.

3. Pruning-shears comprising a fixed blade, a pivoted blade, a lever having swinging connection with the fixed blade, the said lever being provided with a cam-slot, and a wrist-pin on the shank of the pivoted blade, for engaging in said slot, the said wrist-pin consisting of a sleeve, a pin extended from the shank of the pivoted blade, and rollers between said pin and the sleeve.

In testimony whereof I have signed my name to this specification in the presence of two subscribing witnesses.

CHARLES FRANCIS CROSBY.

Witnesses:
GEORGE O. CONTEE,
JOHN F. KELLEY.